United States Patent
Lee et al.

(10) Patent No.: US 12,170,367 B2
(45) Date of Patent: Dec. 17, 2024

(54) POSITIVE ELECTRODE ACTIVE MATERIAL PRECURSOR FOR SECONDARY BATTERY, PREPARATION METHOD THEREOF, AND METHOD OF PREPARING POSITIVE ELECTRODE ACTIVE MATERIAL

(71) Applicant: LG Chem, Ltd., Seoul (KR)

(72) Inventors: Min Joon Lee, Daejeon (KR); Seung Beom Cho, Daejeon (KR); Seong Ji Ye, Daejeon (KR); Yoon Bin Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 152 days.

(21) Appl. No.: 17/606,648

(22) PCT Filed: Sep. 25, 2020

(86) PCT No.: PCT/KR2020/013069
§ 371 (c)(1),
(2) Date: Oct. 26, 2021

(87) PCT Pub. No.: WO2021/060911
PCT Pub. Date: Apr. 1, 2021

(65) Prior Publication Data
US 2022/0238871 A1    Jul. 28, 2022

(30) Foreign Application Priority Data
Sep. 26, 2019  (KR) .................. 10-2019-0119111

(51) Int. Cl.
*H01M 4/505* (2010.01)
*C01G 53/00* (2006.01)
*H01M 4/525* (2010.01)
*H01M 4/02* (2006.01)

(52) U.S. Cl.
CPC ............ *H01M 4/505* (2013.01); *C01G 53/44* (2013.01); *H01M 4/525* (2013.01); *C01P 2002/52* (2013.01); *C01P 2004/03* (2013.01); *C01P 2004/54* (2013.01); *C01P 2004/61* (2013.01); *C01P 2006/11* (2013.01); *C01P 2006/12* (2013.01); *C01P 2006/40* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 5,569,444 A * | 10/1996 | Blanchard | H01M 4/52 429/223 |
| 2015/0364759 A1 | 12/2015 | Kase et al. | |
| 2016/0118662 A1* | 4/2016 | Schroedle | H01M 4/525 429/223 |
| 2018/0083258 A1* | 3/2018 | Robinson | H01M 4/13 |
| 2019/0044139 A1* | 2/2019 | Sakai | H01M 4/525 |
| 2019/0214628 A1 | 7/2019 | Choi et al. | |
| 2019/0260024 A1 | 8/2019 | Nakamura et al. | |
| 2020/0373573 A1 | 11/2020 | Kim et al. | |
| 2021/0184213 A1 | 6/2021 | Song et al. | |
| 2022/0399544 A1 | 12/2022 | Nakamura et al. | |

FOREIGN PATENT DOCUMENTS

| | | | | |
|---|---|---|---|---|
| CN | 1622371 A | 6/2005 | | |
| CN | 104319391 A | 1/2015 | | |
| CN | 107732229 A | 2/2018 | | |
| CN | 109071264 A | 12/2018 | | |
| CN | 109803927 A | 5/2019 | | |
| JP | 3830586 B2 | 10/2006 | | |
| JP | 2015191847 A | 11/2015 | | |
| JP | 2018160323 A | 10/2018 | | |
| JP | 2019149349 A | 9/2019 | | |
| KR | 100765970 B1 | 10/2007 | | |
| KR | 20150115831 A | 10/2015 | | |
| KR | 20180091754 A | 8/2018 | | |
| KR | 20190068474 A | 6/2019 | | |
| KR | 20190075729 A | 7/2019 | | |
| WO | 2013038516 A1 | 3/2013 | | |
| WO | WO-2017135415 A1 * | 8/2017 | ............ | C01G 53/00 |
| WO | WO-2018143783 A1 * | 8/2018 | ............ | C01G 53/00 |

OTHER PUBLICATIONS

International Search Report for Application No. PCT/KR2020/013069, dated Jan. 13, 2021, 3 pages.
Search Report dated Nov. 14, 2023 from the Office Action for Chinese Application No. 202080032030.4 issued Nov. 16, 2023, 3 pages.

* cited by examiner

*Primary Examiner* — Tanisha Diggs

(74) *Attorney, Agent, or Firm* — Lerner David LLP

(57) ABSTRACT

A method of preparing a positive electrode active material precursor for a secondary battery includes preparing a positive electrode active material precursor by a co-precipitation reaction while adding a transition metal-containing solution containing transition metal cations, a basic solution, and an ammonium solution to a batch-type reactor, wherein a molar ratio of ammonium ions contained in the ammonium solution to the transition metal cations contained in the transition metal-containing solution added to the batch-type reactor is 0.5 or less, and a pH in the batch-type reactor is maintained at 11.2 or less.

10 Claims, 7 Drawing Sheets

POSITIVE ELECTRODE ACTIVE MATERIAL PRECURSOR FOR SECONDARY BATTERY, PREPARATION METHOD THEREOF, AND METHOD OF PREPARING POSITIVE ELECTRODE ACTIVE MATERIAL

CROSS-REFERENCE TO RELATED APPLICATIONS

This application is a national phase entry under 35 U.S.C. § 371 of International Application No. PCT/KR2020/013069, filed on Sep. 25, 2020, which claims priority from Korean Patent Application No. 10-2019-0119111, filed on Sep. 26, 2019, the disclosure of which is incorporated by reference herein.

TECHNICAL FIELD

The present invention relates to a positive electrode active material precursor for a secondary battery, a preparation method thereof, and a method of preparing a positive electrode active material.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been used as a positive electrode active material of the lithium secondary battery. Among them, the lithium cobalt oxide ($LiCoO_2$) has been widely used because of its high operating voltage and excellent capacity characteristics, and has been used as a positive electrode active material for high voltage. However, due to an increase in the price of cobalt (Co) and supply instability, there is a limitation in using a large amount of the lithium cobalt oxide as a power source for applications such as electric vehicles, and thus, there is a need to develop a positive electrode active material that may replace the lithium cobalt oxide.

Accordingly, a nickel cobalt manganese-based lithium composite transition metal oxide (hereinafter, simply referred to as "NCM-based lithium composite transition metal oxide"), in which a portion of cobalt (Co) is substituted with nickel (Ni) and manganese (Mn), has been developed. Recently, research has been conducted to increase capacity by increasing an amount of Ni in the NCM-based lithium composite transition metal oxide.

A method of preparing the positive electrode active material may typically include a method of preparing a positive electrode active material precursor by using a continuous stirred tank reactor (CSTR) and a method of preparing a positive electrode active material precursor by using a batch-type reactor. The continuous stirred tank reactor (CSTR) discharges a precursor composed of particles simultaneously while raw materials are added and co-precipitated, and, with respect to the batch-type reactor, raw materials are added according to a volume of the reactor and reacted for a predetermined time, and a precursor is discharged after the completion of the reaction.

In general, the continuous stirred tank reactor (CSTR) method is advantageous in that the control of a metal composition ratio is easy, but, since the addition of the raw materials and the discharge of the product continuously occur at the same time, variations in residence time and reaction time of the positive electrode active material precursors formed in the reactor may be present, and, accordingly, there is a limitation in that non-uniformity in size and composition of the particles formed occurs.

Thus, a precursor of a general high-capacity layered positive electrode active material, such as the NCM-based lithium composite transition metal oxide, is synthesized by using a batch-type reactor. However, in a case in which the batch-type reactor is used, density of particle surface increases as particles grow while a particle growth rate decreases as reaction time elapses. If a primary particle size of the precursor particle increases and the density of the particle surface increases, since surface energy decreases, there is a limitation in that reactivity with a lithium source and a doping source decreases during sintering and uniform sintering is difficult when the positive electrode active material is subsequently prepared by using the precursor.

DISCLOSURE OF THE INVENTION

Technical Problem

An aspect of the present invention provides a method of preparing a positive electrode active material precursor for a secondary battery by using a batch-type reactor, wherein the preparation method may reduce a primary particle size of the positive electrode active material precursor prepared and may reduce surface density of positive electrode active material precursor particles.

Technical Solution

According to an aspect of the present invention, there is provided a method of preparing a positive electrode active material precursor for a secondary battery which includes: preparing a positive electrode active material precursor by a co-precipitation reaction while adding a transition metal-containing solution containing transition metal cations, a basic solution, and an ammonium solution to a batch-type reactor, wherein a molar ratio of ammonium ions contained in the ammonium solution to the transition metal cations contained in the transition metal-containing solution added to the batch-type reactor is 0.5 or less, and a pH in the batch-type reactor is maintained at 11.2 or less.

According to another aspect of the present invention, there is provided a method of preparing a positive electrode active material for a secondary battery which includes: mixing the above-prepared positive electrode active material precursor for a secondary battery with a lithium source and sintering the mixture to form a lithium transition metal oxide.

According to another aspect of the present invention, there is provided a positive electrode active material precursor for a secondary battery which is prepared by the method as described above, wherein an aspect ratio of a primary particle is less than 0.5, an average particle diameter ($D_{50}$) of a secondary particle is in a range of 4 μm to 20 μm, and a specific surface area is 9 $m^2$/g or more.

Advantageous Effects

According to the present invention, in a method of preparing a positive electrode active material precursor for a secondary battery by using a batch-type reactor, the method may reduce a primary particle size of the positive electrode active material precursor prepared and may reduce surface density of positive electrode active material precursor particles.

A positive electrode active material prepared by using the positive electrode active material precursor thus prepared may improve capacity and rate capability when used in a lithium battery, and may improve cycle characteristics and resistance increase characteristics according to cycles.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
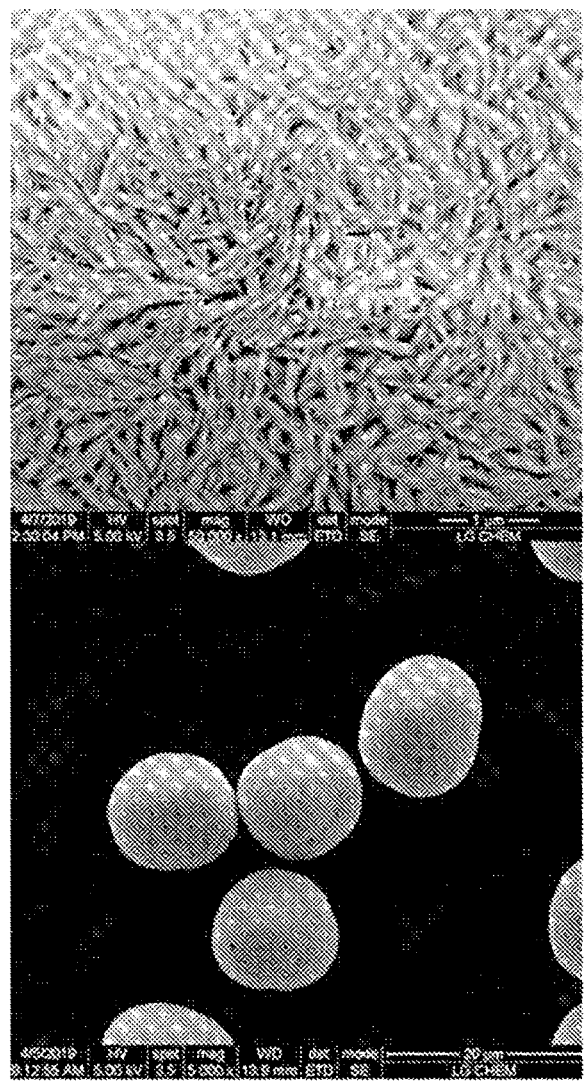
FIG. 1 is magnified scanning electron microscope (SEM) images of a positive electrode active material precursor of Example 1.

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

<Positive Electrode Active Material Precursor>

The present invention provides a method of preparing a positive electrode active material precursor for a secondary battery which includes: preparing a positive electrode active material precursor by a co-precipitation reaction while adding a transition metal-containing solution containing transition metal cations, a basic solution, and an ammonium solution to a batch-type reactor, wherein a molar ratio of ammonium ions contained in the ammonium solution to the transition metal cations contained in the transition metal-containing solution added to the batch-type reactor is 0.5 or less, and a pH in the batch-type reactor is maintained at 11.2 or less.

The method of preparing a positive electrode active material precursor will be described in detail for each step.

First, a positive electrode active material precursor is prepared by a co-precipitation reaction while adding a transition metal-containing solution containing transition metal cations, a basic solution, and an ammonium solution to a batch-type reactor.

The transition metal-containing solution, for example, may include a nickel (Ni)-containing raw material, a cobalt (Co)-containing raw material, and a manganese (Mn)-containing raw material.

The nickel (Ni)-containing raw material, for example, may include nickel-containing acetic acid salts, nitrates, sulfates, halides, sulfides, hydroxides, oxides, or oxyhydroxides, and may specifically include $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, a nickel halide, or a combination thereof, but the present invention is not limited thereto.

The cobalt (Co)-containing raw material may include cobalt-containing acetic acid salts, nitrates, sulfates, halides, sulfides, hydroxides, oxides, or oxyhydroxides, and may specifically include $Co(OH)_2$, $CoOOH$, $Co(OCOCH_3)_2 \cdot 4H_2O$, $Co(NO_3)_2 \cdot 6H_2O$, $Co(SO_4)_2$, $Co(SO_4)_2 \cdot 7H_2O$, or a combination thereof, but the present invention is not limited thereto.

The manganese (Mn)-containing raw material, for example, may include manganese-containing acetic acid salts, nitrates, sulfates, halides, sulfides, hydroxides, oxides, oxyhydroxides, or a combination thereof, and may specifically include a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; a manganese oxyhydroxide, manganese chloride, or a combination thereof, but the present invention is not limited thereto.

The transition metal-containing solution may be prepared by adding the nickel (Ni)-containing raw material, the cobalt (Co)-containing raw material, and the manganese (Mn)-containing raw material to a solvent, specifically water, or a mixture of water and an organic solvent (e.g., alcohol etc.) which may be uniformly mixed with the water, or may be prepared by mixing an aqueous solution of the nickel (Ni)-containing raw material, an aqueous solution of the cobalt (Co)-containing raw material, and the manganese (Mn)-containing raw material.

The ammonium solution, as a complexing agent, for example, may include $NH_4OH$, $(NH_4)_2SO_4$, $NH_4NO_3$, NH₄Cl, CH₃COONH₄, NH₄CO₃, or a combination thereof, but the present invention is not limited thereto. The ammonium solution may be used in the form of an aqueous solution, and, in this case, water or a mixture of water and an organic solvent (specifically, alcohol etc.), which may be uniformly mixed with the water, may be used as a solvent.

In the present invention, a molar ratio of ammonium ions contained in the ammonium solution to the total transition metal cations contained in the transition metal-containing solution added to the batch-type reactor is 0.5 or less. Since the transition metal-containing solution and the ammonium solution are added and reacted so that the molar ratio of the ammonium ions to the total transition metal cations is 0.5 or less, a concentration of the ammonium ions coordinated with the transition metal cations is reduced and a pH is reduced to decrease a rate at which a hydroxyl group and a metal complex salt coordinated with the ammonium ions react and precipitate, and thus, a primary particle size of precursor particles prepared may be reduced. More preferably, the molar ratio of the ammonium ions contained in the ammonium solution to the total transition metal cations contained in the transition metal-containing solution may be in a range of 0.1 to 0.5, for example, 0.2 to 0.35.

The basic solution, as a precipitant, may include a hydroxide of alkali metal or alkaline earth metal, such as NaOH, KOH, or Ca(OH)₂, a hydrate thereof, or an alkaline compound of a combination thereof. The basic solution may also be used in the form of an aqueous solution, and, in this case, water or a mixture of water and an organic solvent (specifically, alcohol etc.), which may be uniformly mixed with the water, may be used as a solvent. The basic solution is added to adjust a pH of a reaction solution, wherein, in the present invention, a pH in the batch-type reactor during the co-precipitation reaction is allowed to be maintained at 11.2 or less. Conventionally, a particle nucleation step and a particle growth step were separately performed by generally adjusting the pH differently during a co-precipitation reaction for forming positive electrode active material precursor particles. Particle nuclei were first formed at a relatively high pH, and particles were grown by adjusting the pH to be relatively low after the particle nucleation. However, when the particle nucleation is performed initially at a high pH and the particle growth is then performed at a low pH by changing the pH, there is a possibility that particles with a non-uniform particle size may be made if stirring is not very good, and this causes a reduction in sphericity of the particles. Thus, in the present invention, particle nucleation and particle growth are performed without changing the pH in the batch-type reactor during the co-precipitation reaction. Since precursor particles are synthesized by maintaining the pH in the batch-type reactor at 11.2 or less without changing the pH during the co-precipitation reaction, a positive electrode active material precursor with uniform particle size and excellent sphericity may be prepared, a primary particle size of the prepared precursor particles may be reduced, and surface density of the precursor particles may be reduced. Preferably, the pH in the batch-type reactor during the co-precipitation reaction may be maintained at 10.8 to 11.2, and may be more preferably maintained at 10.9 to 11.1.

In an embodiment of the present invention, a particle nucleation step and a particle growth step may be separately performed by differently adjusting an rpm of stirring speed. In the particle nucleation step, the stirring speed may be in a range of 600 rpm to 800 rpm, for example, 650 rpm to 750 rpm, and, in the particle growth step, the stirring speed may be in a range of 200 rpm to 400 rpm, for example, 250 rpm to 350 rpm.

The co-precipitation reaction may be performed in a temperature range of 40° C. to 70° C. in an inert atmosphere such as nitrogen or argon.

Particles of a transition metal hydroxide, for example, a nickel-cobalt-manganese hydroxide, are formed by the above-described process and precipitated in the reaction solution. The precipitated transition metal hydroxide particles may be separated according to a conventional method and dried to obtain a transition metal precursor.

The above-prepared positive electrode active material precursor may be represented by Formula 1 below.

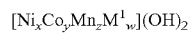   [Formula 1]

In Formula 1, M¹ includes at least one element selected from the group consisting of zirconium (Zr), boron (B), tungsten (W), molybdenum (Mo), chromium (Cr), niobium (Nb), aluminum (Al), magnesium (Mg), hafnium (Hf), tantalum (Ta), lanthanum (La), titanium (Ti), strontium (Sr), barium (Ba), cerium (Ce), fluorine (F), phosphorus (P), sulfur (S), and yttrium (Y), 0.8≤x<1, 0<y≤0.1, 0<z≤0.1, 0≤w≤0.1, and x+y+z+w=1.

In the positive electrode active material precursor of Formula 1, Ni may be included in an amount corresponding to x, for example, 0.8≤x<1. If the amount of the Ni in the positive electrode active material precursor of Formula 1 is 0.8 or more, since the amount of Ni, which is sufficient to contribute to charge and discharge, is secured, high capacity may be achieved.

In the positive electrode active material precursor of Formula 1, Co may be included in an amount corresponding to y, that is, 0<y≤0.1. In a case in which the amount of the Co in the positive electrode active material precursor of Formula 1 is greater than 0.1, there is a concern that cost may increase.

In the positive electrode active material precursor of Formula 1, Mn may be included in an amount corresponding to z, that is, 0<z≤0.1. If z in the positive electrode active material precursor of Formula 1 is greater than 0.1, there is a concern that output characteristics and capacity characteristics of the battery may be reduced.

In the positive electrode active material precursor of Formula 1, M¹ may be a doping element included in the positive electrode active material precursor, wherein the M¹ may be included in an amount corresponding to w, that is, 0≤w≤0.1.

The above-prepared positive electrode active material precursor is a secondary particle formed by aggregation of primary particles, and may have an aspect ratio of the primary particle of less than 0.5.

In the present invention, the expression 'primary particle' denotes the smallest unit particle observed when measured with a scanning electron microscope (SEM). The expression 'secondary particle' denotes an aggregate, in which primary particles are aggregated by physical or chemical bonding between the primary particles without an intentional aggregation or assembly process of the primary particles constituting the secondary particle, that is, a secondary structure.

Also, the expression 'aspect ratio of the primary particle' denotes a ratio of a minor axis length to a major axis length of the primary particle (i.e., minor axis length/major axis length), wherein the major axis length and the minor axis length of the primary particle are obtained from a scanning electron microscope (SEM) image which is obtained by observation of the positive electrode active material precursor with an SEM, and the aspect ratio of the primary particle may be measured by calculating the ratio thereof.

With respect to the above-prepared positive electrode active material precursor, since the aspect ratio of the primary particle satisfies less than 0.5, the surface density of the particle is reduced, and thus, lithium and the doping element may be uniformly mixed into the inside during sintering. Preferably, the aspect ratio of the primary particle of the positive electrode active material precursor may satisfy 0.1 to 0.4, for example, 0.2 to 0.3.

Furthermore, the above-prepared positive electrode active material precursor may have an average particle diameter ($D_{50}$) of the secondary particle of 4 μm to 20 μm, preferably 4 μm to 18 μm, and more preferably 13 μm to 16 μm.

In the present invention, the expression "average particle diameter ($D_{50}$)" may be defined as a particle diameter at a cumulative volume of 50% in a particle size distribution curve. The average particle diameter ($D_{50}$), for example, may be measured by using a laser diffraction method. For example, in a method of measuring an average particle diameter ($D_{50}$) of the positive electrode active material or precursor particles, after the positive electrode active material or precursor particles are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 40 W, and the average particle diameter ($D_{50}$) at the cumulative volume of 50% may then be calculated by the measurement instrument.

In the present invention, since the molar ratio of the ammonium ions contained in the ammonium solution to the transition metal cations contained in the transition metal-containing solution added to the batch-type reactor is 0.5 or less and the pH in the batch-type reactor during the co-precipitation reaction is maintained at 11.2 or less, a positive electrode active material precursor having an average particle diameter ($D_{50}$) of the secondary particle of 4 μm to 20 μm and a specific surface area of 9 $m^2/g$ or more may be prepared. Preferably, the specific surface area of the positive electrode active material precursor may be in a range of 9 $m^2/g$ to 13 $m^2/g$, for example, 9.5 $m^2/g$ to 12.5 $m^2/g$. Since the above-prepared positive electrode active material precursor has an average particle diameter ($D_{50}$) of the secondary particle of 4 μm to 20 μm and the specific surface area satisfies 9 $m^2/g$ or more, reactivity with a lithium source is improved during sintering for preparing a positive electrode active material and uniform sintering is possible, and thus, capacity and rate capability may be improved when the positive electrode active material thus prepared is used in a lithium battery and cycle characteristics and resistance increase characteristics according to cycles may be improved.

<Positive Electrode Active Material>

Also, in an embodiment of the present invention, a positive electrode active material may be prepared through a step of mixing the positive electrode active material precursor prepared as described above with a lithium source and then sintering the mixture to form a lithium transition metal oxide.

As the lithium source, lithium-containing sulfates, nitrates, acetic acid salts, carbonates, oxalates, citrates, halides, hydroxides, or oxyhydroxides may be used, and these materials are not particularly limited as long as they may be dissolved in water. Specifically, the lithium source may include $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$, and any one thereof or a mixture of two or more thereof may be used.

The positive electrode active material precursor and the lithium source may be mixed and sintered at 600° C. to 900° C. to form a lithium transition metal oxide. Preferably, the sintering may be performed at 650° C. to 850° C., for example, 700° C. to 800° C., and the sintering may be performed for 5 hours to 20 hours, for example, 7 hours to 15 hours. More preferably, two-stage sintering consisting of primary sintering and secondary sintering may be performed, and, after the primary sintering is performed at 400° C. to 600° C., for example, 500° C. to 600° C., the secondary sintering may be performed at 600° C. to 900° C., for example, 700° C. to 800° C.

With respect to the positive electrode active material thus prepared, pellet density may be high, at 2.80 g/cc or more, preferably 2.83 g/cc to 3.4 g/cc, and more preferably 2.85 g/cc to 3.3 g/cc. 5 g of the positive electrode active material was put in a mold having a diameter of 22 mm, and the pellet density was measured at a pressure of 2 tons using HPRM-A2 (Hantech Co., Ltd.).

The positive electrode active material of the present invention thus prepared may improve capacity and rate capability when used in a lithium battery, and may improve cycle characteristics and resistance increase characteristics according to cycles.

<Positive Electrode and Secondary Battery>

According to another embodiment of the present invention, provided are a positive electrode for a secondary battery and a lithium secondary battery which include the positive electrode active material prepared as described above.

Specifically, the positive electrode includes a positive electrode collector and a positive electrode active material layer which is disposed on the positive electrode collector and includes the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer rubber (EPDM rubber), a sulfonated-EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode in the form of a slurry, which includes selectively the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexamethylphosphate triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

After 4 liters of distilled water was put in a batch-type reactor (capacity 20 L), the temperature was maintained at 60° C., oxygen gas was supplied at a rate of 3 L/minute, and stirring was performed at 400 rpm.

A transition metal aqueous solution with a concentration of 2.28 mol/L, in which NiSO4, CoSO4, and MnSO4 were mixed in amounts such that a molar ratio of nickel:cobalt:manganese was 92:4:4, was added to the reactor at a rate of 1200 ml/hr, and a 15 wt % aqueous ammonia solution was continuously added to the reactor at a rate of 108 ml/hr (molar ratio of ammonium ions to total transition metal cations=0.35). Also, a 40 wt % aqueous sodium hydroxide solution was added at a rate of 330 ml/hr, and the addition of the aqueous sodium hydroxide solution was adjusted so that a pH was maintained at 11.1.

In the first 30 minutes, nucleation was performed while stirring at 700 rpm, and, thereafter, particles were grown while stirring at 300 rpm. When the inside of the batch-type reactor was filled to some extent by performing a co-precipitation reaction for 8 hours, the stirring was stopped, the precursor particles were precipitated, and, after removing a supernatant after leaving 4 L of the reactants, the reaction was performed again. This process was repeated 4 times and the reaction was performed for a total of 40 hours to form precursor particles. The precursor particles were separated, washed in water, dried in a warm air dryer at 130° C., disintegrated, and sieved to prepare a positive electrode active material precursor.

Example 2

A positive electrode active material precursor was prepared in the same manner as in Example 1 except that the aqueous ammonia solution was continuously added to the reactor at a rate of 62 ml/hr (molar ratio of ammonium ions to total transition metal cations=0.2).

Example 3

A lithium source LiOH was added to the positive electrode active material precursor prepared in Example 1 and mixed such that a molar ratio of Li/Metal (Ni,Co,Mn) was 1.03, and, after $Al_2O_3$ and $ZrO_2$, as doping sources, were further mixed, the mixed powder was introduced into an alumina crucible for a heat treatment. Thereafter, after sintering was performed at 550° C. for 5 hours, the sintered powder was disintegrated, again introduced into the crucible, and then sintered at 760° C. for 10 hours to prepare a positive electrode active material of lithium transition metal oxide.

Example 4

A positive electrode active material was prepared in the same manner as in Example 3 except that the positive electrode active material precursor prepared in Example 2 was used.

Comparative Example 1

A positive electrode active material precursor was prepared in the same manner as in Example 1 except that the aqueous ammonia solution was continuously added to the reactor at a rate of 216 ml/hr (molar ratio of ammonium ions to total transition metal cations=0.7), and the pH was maintained at 11.4.

Comparative Example 2

A positive electrode active material was prepared in the same manner as in Example 3 except that the positive electrode active material precursor prepared in Comparative Example 1 was used.

Experimental Example 1: SEM Observation and Specific Surface Area Measurement

The positive electrode active material precursors and positive electrode active materials prepared in Examples 1 to 4 and Comparative Examples 1 and 2 were observed by using a scanning electron microscope (SEM).

Figure 2:
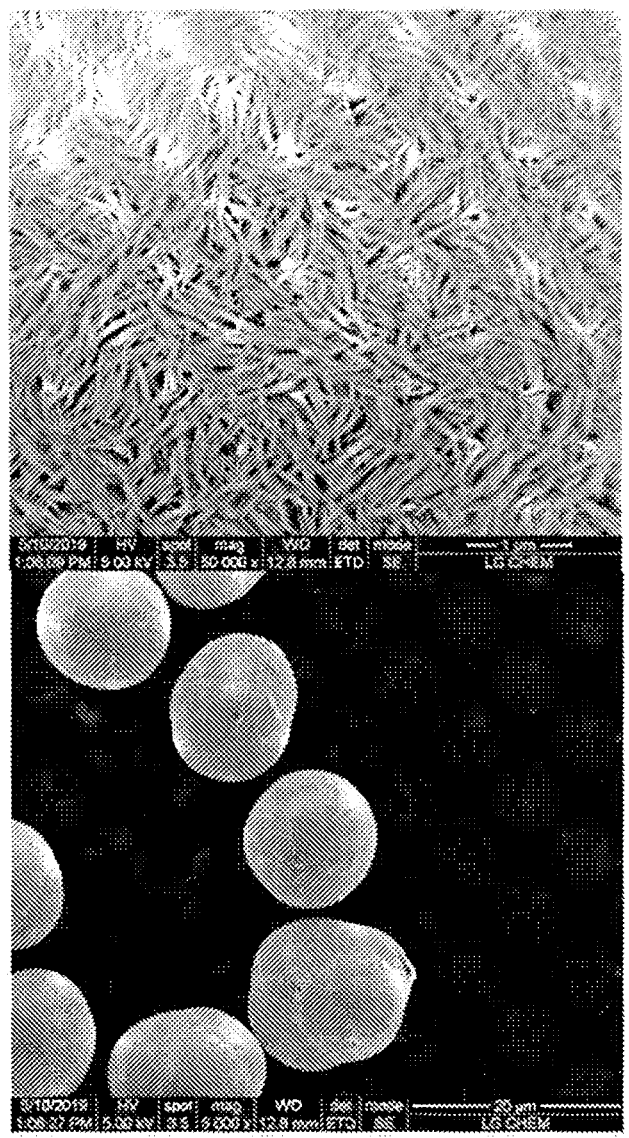
FIG. 2 is magnified scanning electron microscope (SEM) images of a positive electrode active material precursor of Example 2.
Figure 3:
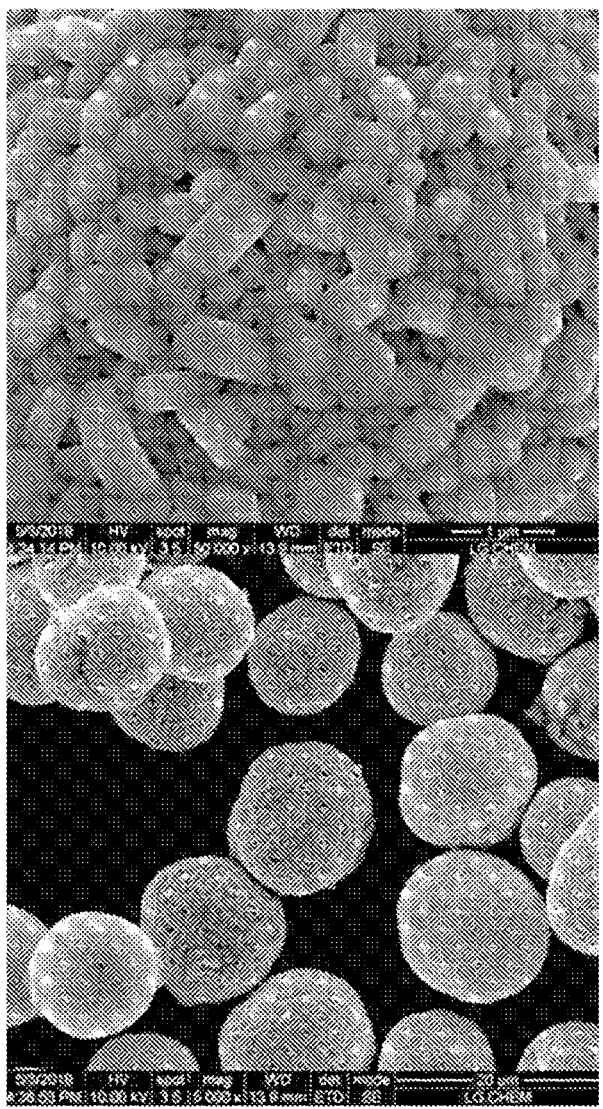
FIG. 3 is magnified scanning electron microscope (SEM) images of a positive electrode active material of Example 3.
Figure 4:
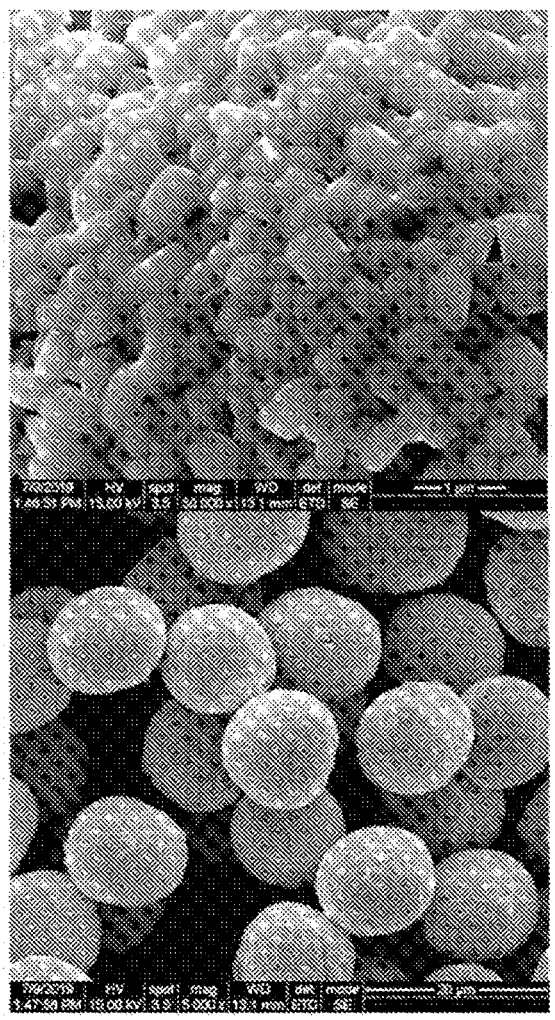
FIG. 4 is magnified scanning electron microscope (SEM) images of a positive electrode active material of Example 4.
Figure 5:
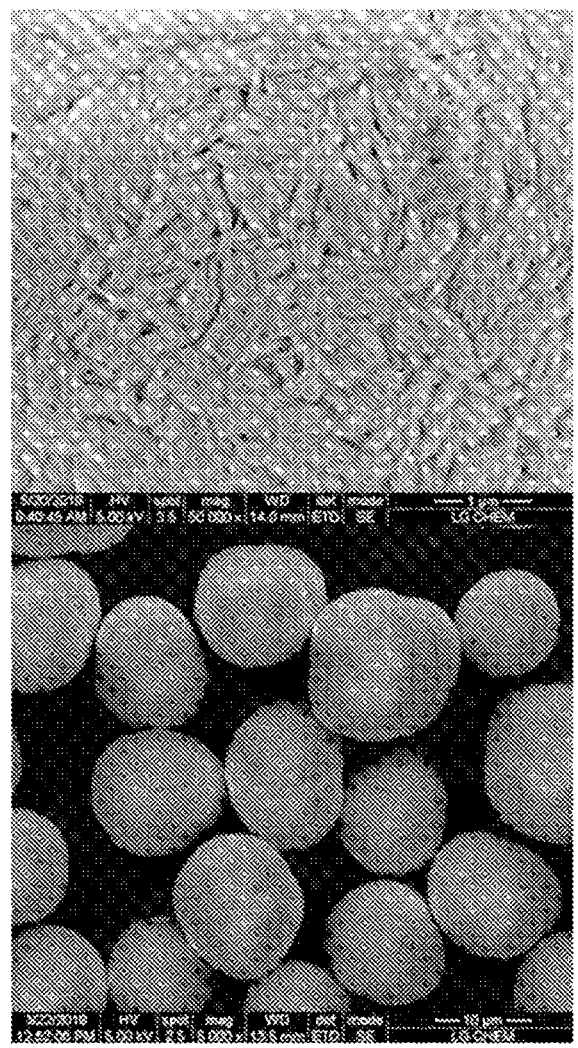
FIG. 5 is magnified scanning electron microscope (SEM) images of a positive electrode active material precursor of Comparative Example 1.
Figure 6:
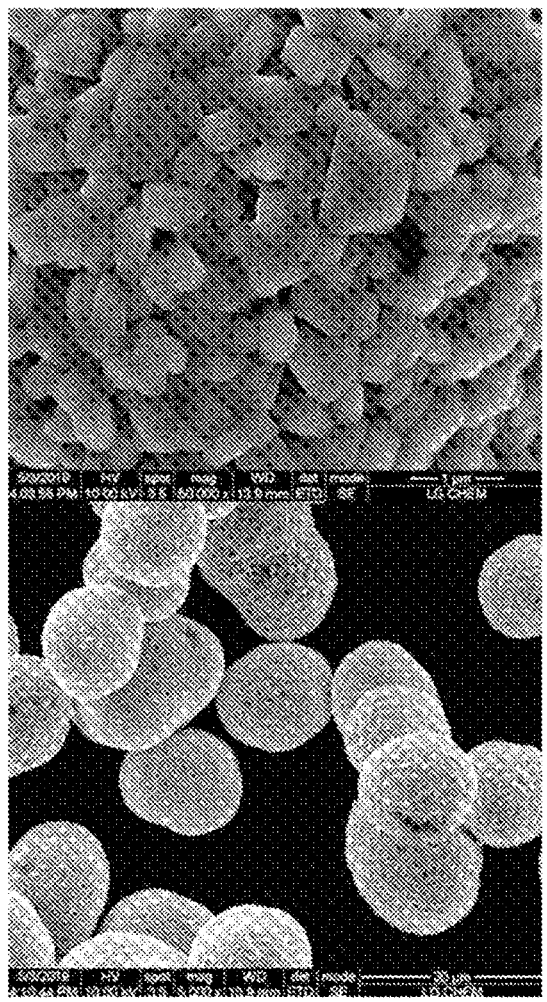
FIG. 6 is magnified scanning electron microscope (SEM) images of a positive electrode active material of Comparative Example 2.

FIG. 1 is SEM images of the positive electrode active material precursor particles of Example 1, FIG. 2 is SEM images of positive electrode active material precursor particles of Example 2, FIG. 3 is SEM images of positive electrode active material particles of Example 3, FIG. 4 is SEM images of positive electrode active material particles of Example 4, FIG. 5 is SEM images of positive electrode active material precursor particles of Comparative Example 1, and FIG. 6 is SEM images of positive electrode active material particles of Comparative Example 2.

Referring to FIGS. 1, 2, and 5, with respect to the positive electrode active material precursor particles of Examples 1 and 2 prepared according to the method of the present invention, it may be confirmed that, since a length in a minor axis direction was shorter than that of the positive electrode active material precursor particles of Comparative Example 1, aspect ratios were lower and sizes of primary particles formed were smaller than those of the positive electrode active material precursor particles of Comparative Example 1.

Also, average particle diameters ($D_{50}$), primary particle sizes, primary particle aspect ratios, and Brunauer-Emmett-Teller (BET) specific surface areas of the positive electrode active material precursors prepared in Examples 1 and 2 and Comparative Example 1 were measured and presented in Table 1 below.

In this case, the average particle diameter ($D_{50}$) of the precursor particles was measured by introducing the precursor particles into a laser diffraction particle size measurement instrument (e.g., Microtrac MT 3000) and irradiating the precursor particles with ultrasonic waves having a frequency of 28 kHz and an output of 40 W.

Also, the size and aspect ratio of the primary particle of the precursor particle were obtained by measuring a minor axis length and a major axis length of the primary particle from the SEM images of FIGS. 1, 2, and 5.

The BET specific surface area was measured using a gas adsorption analyzer (BELSORP mini II).

TABLE 1

| | Average particle diameter ($D_{50}$) (μm) | Specific surface area (m²/g) | Primary particle aspect ratio | Primary particle size Minor axis length/major axis length (μm) |
|---|---|---|---|---|
| Example 1 | 15.16 | 9.67 | 0.4 | 0.2/0.5 |
| Example 2 | 14.77 | 10.29 | 0.2 | 0.1/0.5 |
| Comparative Example 1 | 15.20 | 4.00 | 0.7 | 0.35/0.5 |

Referring to FIGS. 1 to 4 and Table 1, the precursors of Examples 1 and 2 prepared according to the embodiment of the present invention had an aspect ratio of the primary particle of less than 0.5, wherein the primary particle sizes were small and the specific surface areas were high at 9 m²/g or more. In contrast, the precursor prepared according to Comparative Example 1 had an aspect ratio of 0.7, wherein the precursor had a relatively larger primary particle size than the precursors of Examples 1 and 2, and the specific surface area was 4.00 m²/g, which was significantly lower than those of the examples.

Experimental Example 2: Precursor Tap Density and Active Material Pellet Density Tap density was measured by putting 50 g of each of the positive electrode active material precursors prepared in Examples 1 and 2 and Comparative Example 1 in a 100 ml mass cylinder and performing 2,500 strokes using a STAV-2 tap density meter (J. Engelsmann AG). The results thereof are presented in Table 2 below.

Also, 5 g of each of the positive electrode active materials prepared in Examples 3 and 4 and Comparative Example 2 was put in a mold having a diameter of 22 mm, and pellet density was measured at a pressure of 2 tons using HPRM-A2 (Hantech Co., Ltd.). The results thereof are presented in Table 2 below.

TABLE 2

| | Tap density (g/cc) | Pellet density (@2ton, g/cc) |
|---|---|---|
| Example 1 (Precursor) | 1.96 | — |
| Example 2 (Precursor) | 2.0 | — |

TABLE 2-continued

| | Tap density (g/cc) | Pellet density (@2ton, g/cc) |
|---|---|---|
| Example 3 (Active material) | — | 2.88 |
| Example 4 (Active material) | — | 2.89 |
| Comparative Example 1 (Precursor) | 2.08 | — |
| Comparative Example 2 (Active material) | — | 2.77 |

Referring to Table 2, tap densities of the positive electrode active material precursors of Examples 1 and 2 were reduced in comparison to that of the positive electrode active material precursor of Comparative Example 1, and pellet densities of the positive electrode active materials of Examples 3 and 4 were 2.8 g/cc or more, wherein the pellet densities were improved in comparison to that of the positive electrode active material of Comparative Example 2.

Experimental Example 3: Lithium Secondary Battery Performance Evaluation

Each of the positive electrode active materials prepared in Examples 3 and 4 and Comparative Example 2, a carbon black conductive agent, and a PVdF binder were mixed in an N-methylpyrrolidone solvent at a weight ratio of 97.5:1:1.5 to prepare a positive electrode material mixture, and one surface of an aluminum current collector was coated with the positive electrode material mixture, dried at 130° C., and then rolled to prepare a positive electrode.

Lithium metal was used as a negative electrode.

Each lithium secondary battery was prepared by preparing an electrode assembly by disposing a porous polyethylene separator between the positive electrode and negative electrode prepared as described above, disposing the electrode assembly in a case, and then injecting an electrolyte solution into the case. In this case, the electrolyte solution was prepared by dissolving 1.0 M lithium hexafluorophosphate (LiPF$_6$) in an organic solvent composed of ethylene carbonate/ethylmethyl carbonate/diethyl carbonate (mixing volume ratio of EC/EMC/DEC=3/5/2).

Each lithium secondary battery half cell prepared as described above was charged at 0.1 C to a voltage of 4.25 V in a constant current/constant voltage (CCCV) mode at 25° C. (termination current of 0.05 C), and discharged at a constant current of 0.1 C to a voltage of 2.5 V to measure initial charge and discharge capacity. Measurement results are presented in FIG. 7.

Also, in order to check rate (C-rate) capability, ratios of capacities when each lithium secondary battery half cell was respectively discharged at 0.1 C and 0.33 C to capacity when each lithium secondary battery half cell was charged at 0.1 C and discharged at 0.1 C were measured. Measurement results are presented in Table 3 below.

TABLE 3

| | 0.1C/0.1C (mAh/g) | 0.33C/0.1C (%) |
|---|---|---|
| Example 3 | 238.9/221.8 | 95.4 |
| Example 4 | 243.4/226.4 | 93.4 |
| Comparative Example 2 | 239.1/219.0 | 93.0 |

Figure 7:
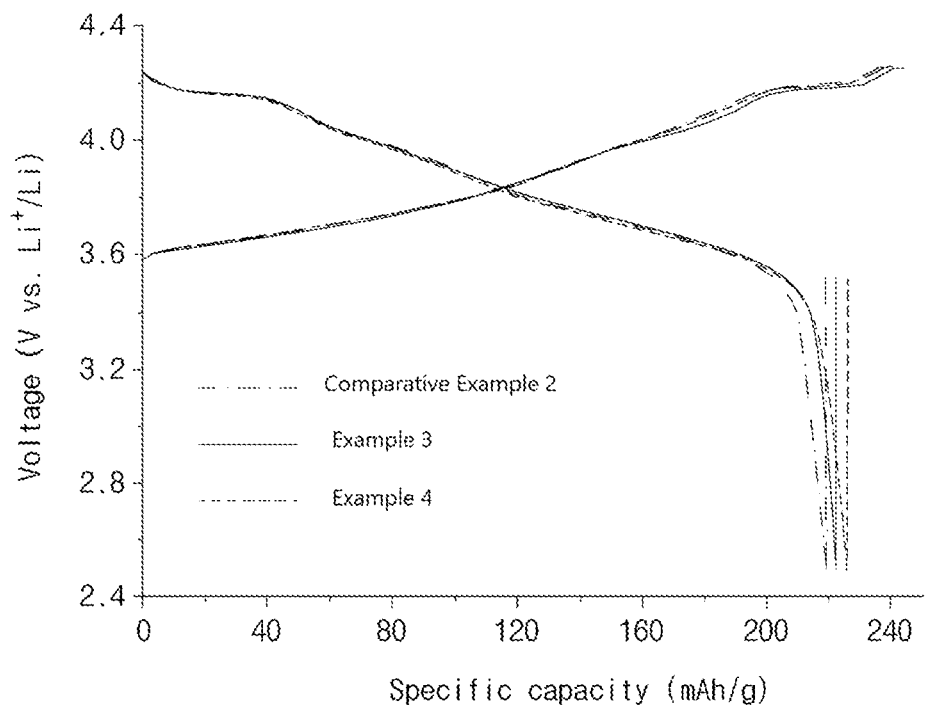
FIG. 7 is a graph illustrating performances of lithium secondary batteries prepared by using the positive electrode active materials according to the examples and comparative example.

Referring to FIG. 7 and Table 3, it may be confirmed that, when the positive electrode active materials of Examples 3 and 4 were used, capacities and rate capabilities of the lithium secondary batteries were significantly improved in comparison to those when the positive electrode active material of Comparative Example 2 was used.

Experimental Example 4: Life Characteristics and Resistance Increase Rate Evaluation Each lithium secondary battery half cell, which was prepared as in Experimental Example 3, was charged at 0.33 C to a voltage of 4.25 V in a CCCV mode at 45° C., and discharged at a constant current of 0.33 C to a voltage of 2.5 V to measure capacity retention and resistance increase rate when cycles of charge and discharge were performed. The results thereof are presented in FIG. 8 and Table 4 below.

TABLE 4

| | Capacity retention (%) (@30 cycles) | Resistance increase rate (%) (@30 cycles) |
|---|---|---|
| Example 3 | 95.4 | 89.4 |
| Comparative Example 2 | 95.0 | 99.0 |

Figure 8:
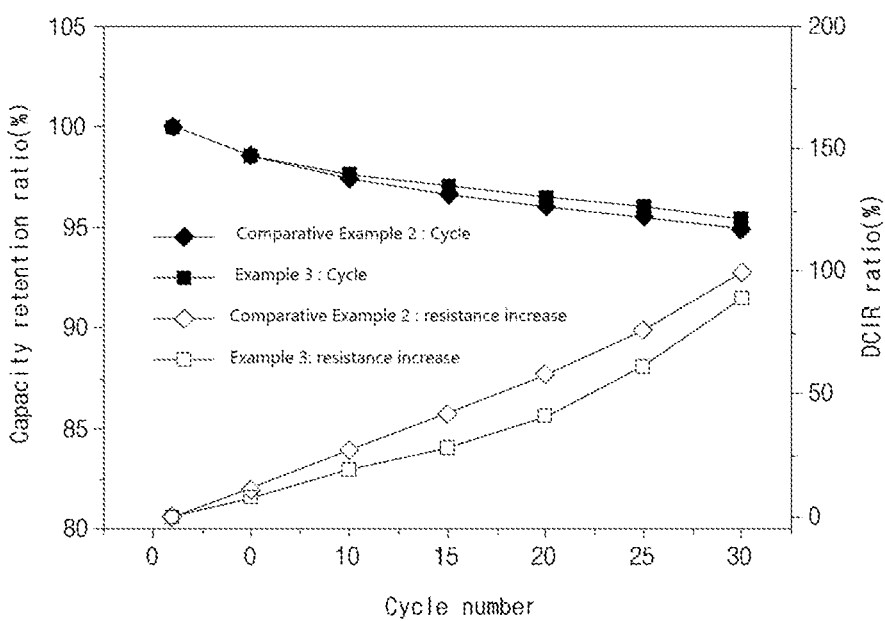
FIG. 8 is a graph illustrating capacity retentions and resistance increase rates of the lithium secondary batteries prepared by using the positive electrode active materials according to the example and comparative example.

Referring to FIG. 8 and Table 4, it may be confirmed that, when the positive electrode active material of Example 3 was used, the capacity retention of the lithium secondary battery was slightly improved and the resistance increase rate was significantly reduced in comparison to those when the positive electrode active material of Comparative Example 2 was used.

The invention claimed is:

1. A method of preparing a positive electrode active material precursor for a secondary battery, the method comprising: preparing a positive electrode active material precursor by a co-precipitation reaction while adding a transition metal-containing solution containing transition metal cations, a basic solution, and an ammonium solution to a batch-type reactor,
   wherein a molar ratio of ammonium ions contained in the ammonium solution to the transition metal cations contained in the transition metal-containing solution added to the batch-type reactor is 0.5 or less,
   wherein a pH in the batch-type reactor is maintained at 11.2 or less, and
   wherein particle nucleation and particle growth are performed without changing the pH in the batch-type reactor during the co-precipitation reaction.

2. The method of claim 1, wherein the molar ratio of the ammonium ions contained in the ammonium solution to the transition metal cations contained in the transition metal-containing solution added to the batch-type reactor is in a range of 0.1 to 0.5.

3. The method of claim 1, wherein the pH in the batch-type reactor is maintained at 10.8 to 11.2.

4. The method of claim 1, wherein, during the co-precipitation reaction, a stirring speed in a particle nucleation step is in a range of 600 rpm to 800 rpm, and a stirring speed in a particle growth step is in a range of 200 rpm to 400 rpm.

5. The method of claim 1, wherein the positive electrode active material precursor has an aspect ratio of a primary particle of less than 0.5.

6. The method of claim 1, wherein the positive electrode active material precursor has an average particle diameter ($D_{50}$) of a secondary particle of 4 μm to 20 μm and has a specific surface area of 9 m²/g or more.

7. The method of claim 6, wherein the specific surface area is from 9 m²/g to 13 m²/g.

8. The method of claim 1, wherein the positive electrode active material precursor is represented by Formula 1:

$$[Ni_xCo_yMn_zM^1_w](OH)_2 \qquad \text{[Formula 1]}$$

wherein, in Formula 1, $M^1$ comprises at least one element selected from the group consisting of zirconium (Zr), boron (B), tungsten (W), molybdenum (Mo), chromium (Cr), niobium (Nb), aluminum (Al), magnesium (Mg), hafnium (Hf), tantalum (Ta), lanthanum (La), titanium (Ti), strontium (Sr), barium (Ba), cerium (Ce), fluorine (F), phosphorus (P), sulfur (S), and yttrium (Y), $0.8 \leq x < 1$, $0 < y \leq 0.1$, $0 < z \leq 0.1$, $0 \leq w \leq 0.1$, and $x+y+z+w=1$.

9. The method of claim 1, wherein the molar ratio of the ammonium ions to the transition metal cations is from 0.2 to 0.35.

10. A method of preparing a positive electrode active material for a secondary battery, comprising:
mixing the positive electrode active material precursor for a secondary battery, which is prepared according to claim 1, with a lithium source and sintering the mixture to form a lithium transition metal oxide.

* * * * *